(12) United States Patent
Sisodia et al.

(10) Patent No.: US 7,031,579 B2
(45) Date of Patent: Apr. 18, 2006

(54) HIGH RESOLUTION DISPLAY COMPONENT, SYSTEM AND METHOD

(75) Inventors: Ashok Sisodia, Arlington, TX (US); Thomas St. John, Bedford, TX (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 10/180,896

(22) Filed: Jun. 26, 2002

(65) Prior Publication Data

US 2004/0001679 A1   Jan. 1, 2004

(51) Int. Cl.
 *G02B 6/04* (2006.01)
(52) U.S. Cl. ............... 385/120; 385/121; 385/46
(58) Field of Classification Search .......... 385/120, 385/121
 See application file for complete search history.

(56) References Cited

U.S. PATENT DOCUMENTS

| | | | |
|---|---|---|---|
| 2,825,260 A | | 3/1958 | O'Brien |
| 3,043,179 A | | 7/1962 | Dunn |
| 3,489,482 A | | 1/1970 | Brill |
| 3,825,336 A | * | 7/1974 | Reynolds ................. 355/1 |
| 4,057,338 A | | 11/1977 | Yevick |
| 4,101,188 A | * | 7/1978 | Yevick ................. 385/119 |
| 4,154,515 A | * | 5/1979 | Yevick .................. 353/38 |
| 4,482,805 A | * | 11/1984 | Palmer ............... 250/227.21 |
| 4,544,259 A | * | 10/1985 | Kanaoka et al. ........... 355/1 |
| 4,815,816 A | | 3/1989 | Schneider |
| 4,828,348 A | | 5/1989 | Pafford |
| 4,923,276 A | * | 5/1990 | Wells .................. 250/206.2 |
| 4,932,747 A | * | 6/1990 | Russell et al. ............. 385/115 |
| 4,983,015 A | * | 1/1991 | Bourguignat et al. ....... 385/116 |
| 5,125,064 A | | 6/1992 | Naselli et al. |
| 5,127,078 A | | 6/1992 | Terry et al. |
| 5,251,280 A | | 10/1993 | Asada et al. |
| 5,453,838 A | | 9/1995 | Danielian et al. |
| 5,465,315 A | | 11/1995 | Sakai et al. |
| 5,502,457 A | | 3/1996 | Sakai et al. |
| 5,515,470 A | | 5/1996 | Eikelmann et al. |
| 5,546,492 A | | 8/1996 | Ansley et al. |
| 5,715,345 A | | 2/1998 | McKinley |

(Continued)

FOREIGN PATENT DOCUMENTS

DE           39 21 489 A1       1/1991

(Continued)

OTHER PUBLICATIONS

Patent Abstracts of Japan, vol. 006, No. 053, Apr. 8, 1982, for JP 56 16808 A (Dec. 24, 1981).

*Primary Examiner*—Joseph Williams
*Assistant Examiner*—Dalei Dong
(74) *Attorney, Agent, or Firm*—Tiajoloff & Kelly (57) ABSTRACT

An optical system provides a higher resolution image, especially for use with a projection system, using a combiner formed of fiber optics each having an input end and an output end, with the fiber optics grouped together so that the combiner has one or more image input ends each configured to receive an image from an associated image source. The input images are combined to yield an output image at the other end of the combiner that is smaller in area than the sum of the input image areas, increasing resolution. According to an embodiment, the output image is also counter-distorted to compensate for the distortion of the image caused by the relay optics used in projection.

76 Claims, 7 Drawing Sheets

U.S. PATENT DOCUMENTS

| | | | |
|---|---|---|---|
| 5,838,865 A * | 11/1998 | Gulick | 385/121 |
| 5,862,285 A | 1/1999 | Danielian et al. | |
| 5,966,108 A * | 10/1999 | Ditzik | 345/75.2 |
| 6,219,184 B1 * | 4/2001 | Nagatani | 359/472 |
| 6,219,480 B1 * | 4/2001 | Cassarly et al. | 385/46 |
| 6,272,155 B1 * | 8/2001 | Sekiguchi | 372/6 |
| 6,385,371 B1 * | 5/2002 | Li | 385/43 |
| 6,595,674 B1 * | 7/2003 | Yoneda | 362/555 |
| 6,631,230 B1 * | 10/2003 | Campbell | 385/121 |

FOREIGN PATENT DOCUMENTS

| | | |
|---|---|---|
| EP | 0 722 108 A1 | 7/1996 |
| GB | 2 334 399 A | 8/1999 |
| JP | 56-168608 | 12/1981 |

* cited by examiner

HIGH RESOLUTION DISPLAY COMPONENT, SYSTEM AND METHOD

FILED OF THE INVENTION

This invention relates to fiber optic projection or viewing systems, especially those with small image sources such as transmissive liquid crystal (LC) microdisplays, reflective liquid crystal on silicon (LCoS) microdisplays or digital micromirror devices (DMDs) and emissive organic light emitting diode (OLED) microdisplays. The invention relates also to projector systems and methods for displaying images from such displays.

BACKGROUND OF THE INVENTION

A number of currently available display or projection systems project or display images generated on microdisplays, which are generally small color image sources that have a screen with a diagonal dimension of about 1-inch or smaller. These systems are used in a wide variety of applications, including in televisions, in computer monitors, and also simulation systems for aircraft, in which simulated out-the-window views are generated and displayed do create a realistic visual training environment.

Microdisplay systems are usually in the form of a stationary projector that projects an enlarged image from the microdisplay screen on a screen of some sort, but may be, especially in vehicle simulators, a projector that moves with the head of the user, such as the system disclosed in U.S. Pat. No. 6,312,129 issued Nov. 6, 2001 to Sisodia et al., or another type of display system in which the image is sent directly into the eye of the viewer (or two images sent into both eyes for stereoscopic effects) by a system of optics, such as in U.S. Pat. No. 5,886,822 to Spitzer, both of which patents are herein incorporated by reference. Whatever the form of the microdisplay device, however, it relies on some sort of optics to enlarge the image from the microdisplay for viewing in a fairly large field of view. This presents a problem, because the pixel or image resolution of off-the-shelf microdisplays make the greatly enlarged pixels to be an undesirably visible size, and the resulting projected image is of coarse quality. Increasing the number of pixels would increase the quality of the image, but the number of pixels displayed by commercial off-the-shelf image display devices is a hardware limitation that is fixed at manufacture, and generally conforms to industry standards for video, such as SXGA, with 1280×1024 pixels, or different numbers of pixels, usually in the range of about 800×600 pixels to 1000×1000 pixels.

A larger image display with more pixels would encounter the problem that existing optical projection systems require an image source of a specific size, resolution and pixel layout, and a larger image screen would not be compatible with this. If special optics were made, the larger image screen would require larger lenses and/or other optics for projecting the image from these larger displays. Larger optics are substantially more expensive than smaller optics, and also add a substantial weight to the projection system, which is undesirable in many applications, especially head-supported projectors.

In addition to the problem of inadequate projected pixel density and resolution, aberrations from the display optics also can present a problem. In an ideal optical system, all rays of light from a point in the object plane would converge to the same point in the image plane, forming a clear image. However, frequently imperfections in the optical system cause different rays to converge to different points, resulting in aberrations.

Common aberrations that present problems and deform the images viewed are field curvature aberration and distortion. In field-curvature aberration, parts of the projection screen image are out of focus, and this is most commonly encountered when a lens projects onto a planar screen. For rays entering the lens on or near the optical axis (paraxial rays) the focal length of the lens (barring other aberrations) is constant. Because the distance from the center of the lens to the focus point is constant, the image described by the lens is focused at a curved arcuate surface, not a flat one. The result of projection on a flat surface is therefore that parts of the image are out of focus.

Distortion usually occurs in systems in which the focal length of the lens, and hence the magnification it causes, varies over the surface of the lens (i.e., a ray hitting the lens at one spot will be focused more or less than at another location on the lens). This leads to distortion wherein parts of the image are magnified more or less than others. The most common distortions are barrel distortion (where the center of the image is bigger than the edges) and pin cushion distortion (where the edges are bigger than the center). These can commonly be seen on TV's and computer monitors. Distortion also is often due to angulation between the viewer's eye, the projection screen and the projector lens, which occurs unless projection is directly from the eyepoint of the viewer. This angulation occurs, for example, in head-mounted projection systems where the projector is mounted on the side of the head of the user, and projection from the side of the head causes the projected image to strike the projection screen (or a visor in front of the user's face if that is used) at an angle. This angle creates a distortion, and, as a result, a rectangular image at the image source can be distorted to a non-rectangular shape viewed by the user.

To produce a regular shape for viewing in the projection system, some prior art systems create the image at the image source using only that portion of the display that will be projected as the desired shape, e.g., a rectangle. This approach, however, wastes pixels of the display, because the commercially available image displays are virtually always rectangular, and the subset of the image on the image source is usually far from rectangular. The use of the shaped image therefore makes use of only some of the pixels of the image source, and the pixels outside the counter-distorted perimeter in the image source are sacrificed, which reduces the number of pixels ultimately projected, and, as a consequence, reduces the ultimate resolution of the image projected.

SUMMARY OF THE INVENTION

It is accordingly an object of the invention to provide an optical system that provides a higher resolution image source from one or more lower resolution sources, such as off-the-shelf display devices, preferably for use with a projection system, especially a head-mounted projection system.

It is also an object of the invention to provide a higher resolution image source than in existing microdisplays, especially for use with projection optics or other relay optic arrangements.

According to an aspect of the invention, an optical system is provided that comprises a combiner comprising optical fibers each having an input end and an output end. The optical fibers are secured so that the combiner has image input portions each made up of a respective set of the input ends of the optical fibers secured in input patterns having an input area. Each input portion of the combiner is configured to receive light of a respective image displayed by a respective image source. The optical fibers each transmit a respective portion of the light received from the associated image to the output end thereof. The output ends of the optical fibers are positioned in an output pattern in an image output portion of the combiner. The output end is configured to transmit an output image therefrom containing the light transmitted through the optical fibers from the input portions. The output image has an area that is less than a sum of the areas of said input areas.

Also, according to an aspect of invention, an optical component comprises a combiner formed of optical fibers, with each optical fiber having an input end and an output end. The optical fibers are grouped together so that said combiner has a plurality of image input ends and an image output end. Each input end is made up of subset of the optical fibers with the input ends thereof supported in a respective position in an input pattern so as to align with a respective pixel of a microdisplay when aligned with said image input end and to receive from said pixel light corresponding to an image displayed on the microdisplay at an input resolution of pixels per area. The image output end is formed of the output ends of the optical fibers supported in an output pattern of pixels and it transmits an output image at an output resolution of pixels per area. The output image is formed from light from the pixels of the microdisplays received from the input ends. The output resolution is higher in at least one dimension than the input resolutions.

According to another aspect of the invention, an optical system comprises a display device transmitting light in a pattern of an image to be displayed and an optical component comprising optical fibers each having an input end adapted to receive light and an output end through which the light received is transmitted. The component has an input end containing the input ends of the optical fibers positioned in an input pattern so that each of said fibers receives light from a respective pixel or location of the image displayed by the display device and transmits that light to the output end thereof. The component further has an output end composed of the output ends of the optical fibers supported so as to transmit the light of the image received at the input end in an output pattern. An optical relay system will receives the light from the output end of the component and transmits the light to one or two eyes of a user to be viewed. The optical relay system is not perfect resulting in aberrations, such as distortion or field curvature aberration, in the image. The component has the pattern of light output positions of the output ends of the optical fibers in positions such that the output pattern has an inverse alteration of the image displayed on the display device that at least partially counteracts these aberrations of the relay optics. The alteration is preferably in two or three dimensions.

According to aspects of the invention, the aberrations that are corrected for are deforming aberrations, particularly field curvature and distortion.

According to a further aspect of the invention, an optical system comprises an image generator, and a plurality of microdisplay devices operatively associated with the image generator, and each of which has a display screen with a diagonal dimension of less than two inches. The image generator generates and transmits to each of the microdisplay devices a respective electronic image signal, and the microdisplay devices each produce from the associated electronic image signal a respective image made up of pixels of transmitted light. An optical combiner comprises a plurality of sets of optical fibers, these optical fibers each having an input end and an output end. Each set of optical fibers is associated with a respective one of the display screens of the microdisplay devices and has the input ends thereof secured in a pattern adjacent thereto so that each optical fiber receives the light from a respective pixel of the associated microdisplay device and transmits said light to the output end thereof. The output ends of the sets of optical fibers are secured in an output pattern in which the light transmitted through the optical fibers is combined in an output image having an area and made up of pixels of the light transmitted through the optical fibers. The output image has a greater number of the pixels per area thereof than the microdisplay devices.

It is also an object of the invention to provide a fiber optic component linking one or more image sources to relay optics that project or display transmitted images to a viewer. The optical component receives the image from the image source or sources and outputs the image received to the optics in a form that compensates at least partly for aberrations, especially distortion or field-curvature aberration, of the image caused by the relay optics, so that the ultimately projected image viewed by the user is rectilinear and in a regular shape, preferably a rectangle similar to a combination of the image sources.

It is also an object of the invention to provide a method of projecting images using a plurality of separate image sources the displays of which are combined and projected.

Also according to the invention, a method of displaying an image to a viewer is provided. The method comprises the steps of outputs generating at least two input images each representing a portion of the image to be displayed, displaying each of the input images on respective screens of respective microdisplay devices so as to generate light corresponding to the input images, transmitting the light from the input images through an optical combiner formed of optical fibers, where the optical combiner outputting light of said input images combined in an output image, said output image being of higher resolution than said input images, and relaying the output image via relay optics to the viewer.

This method may also make use of a combiner that compensates for aberrations in the relay optics.

Other objects and advantages of the invention will become apparent from the specification herein.

DETAILED DESCRIPTION

Figure 1:
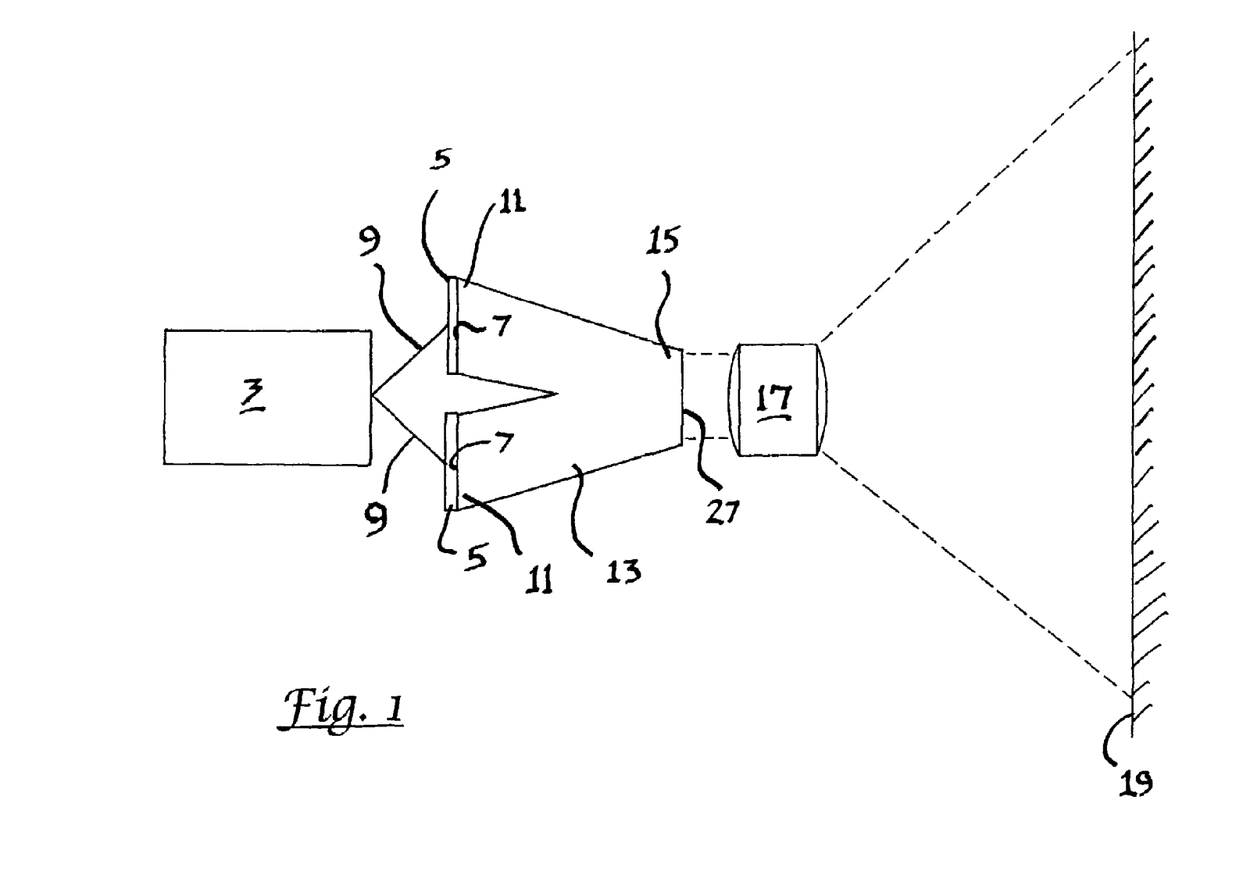
FIG. 1 shows a schematic view of a system employing an optical component according to the invention.

As best shown in FIG. 1, display system 1 comprises an image generator computer system 3 connected with two or more image display devices 5, to which the system 3 transmits electronic image signals along one or more connection lines 9. The image sources or display devices 5 generate light corresponding to images defined by the image signals. The image sources 5 are each associated with a respective face 7 of an input portion or end 11 of an optical component 13. Optical component 13 receives the light of the images on the image display devices 5 and transmits the light so that the images are combined as a composite output image at output portion or end 15. The light from this output image enters relay optics assembly 17, which projects the output image onto a surface for viewing, such as projection screen 19.

The image generator system may be any electronic system that produces an image or video for display, especially pixelated images, i.e., images made up of a pattern or field of individual pixels. The image generator may be a simple computer for which display of the standard monitor output is desired. Alternatively, the image generator may be a more complex computer system, such as an image generator for a simulator of a vehicle, especially an aircraft, in which detailed real-time views of one or more out-the-window scenes are formulated by image generator software running on a computer system and output therefrom for display to a user. Also as an alternative, the image generation system may be any type of video source, such as a television receiver or video player.

Whichever sort of image generator is used, it must be configured so that the electronic image signals that it generates and sends to the image display devices 5 correspond to images that are configured to be assembled by the component 13 and displayed as a desired composite image. For instance, in an electronic data processing computer operating as a simulation image generator, an out-the-window scene of high resolution may be rendered as a two-dimensional array of pixel data in the software, and this field of data then output to a circuit, e.g., a specially configured video output board, connecting the computer system to the image display devices 5. This circuit then divides the high-resolution data into two or more separate fields of lower resolution data that are then converted to two or more lower-resolution images, each for transmission to, and display on, a respective one of the image display devices 5. This division of the internal image in the image generator into two or more separate image streams may also be accomplished purely by software where the image generator is a computerized system, using hardware, or a combination of hardware and software.

In the preferred embodiments, the electronic image signals output to the display devices 5 are conventional digital video signals that represent serial frames of pixelated images, and the color of each pixel of the image is defined using three packets of data, usually each a byte, one for each red, green or blue color component of the color of the pixel, as is well known in the art. Alternatively, the image signals output may be any form of signal that is usable by the image sources or display devices 5 to display visible images, and other different image signal formats and types of video (e.g., an analog signal for a rasterized display on a CRT) may also be used advantageously with the system of the invention.

In the preferred embodiment, the image display devices 5 are each a microdisplay unit. Microdisplays are typically on the scale of approximately one inch in diagonal measurement and, preferably, within the range of 0.5 inches to 1.5 or 2 inches in diagonal screen measurement. Typical off-the-shelf products have displays of various resolutions on the order of about 1000×1000 pixels, for example, 800×600 or 1280×1024 pixels.

Each display device 5 has a screen, most preferably a field of color pixels, and it displays on the screen an image by transmitting light therefrom. The microdisplay image display screen is preferably a light emitting screen, especially a backlit image display using liquid crystal displays ("LCDs"), and particularly preferred being active matrix LCDs ("AMLCDs"). Other suitable technologies for microdisplays include reflective liquid crystal on silicon (LCoS) microdisplays or microelectronical systems, including digital micromirror devices (DMDs), and emissive organic light emitting diode (OLED) microdisplays. Examples of reflective LCoS devices include Direct Drive Image Light Amplifier (D-ILA) technology such as developed by Hughes and JVC. Examples of micro-electromechanical systems (MEMS) are digital micromirror devices ("DMD"), such as the DMD microdisplay sold by Texas Instruments, also referred to as digital light processing or DLP technology. Examples of emissive devices include small cathode ray tubes (CRTs) sold by Brimar Limited, organic light emitting diode (OLED) displays sold by eMagin Corp., field emission displays, plasma displays and electroluminescent (EL) displays or any of a variety of other display technologies or variants or analogues of these. The screens are preferably flat, but curved screens, such as exist in some CRTs, may also be used.

Figure 9:
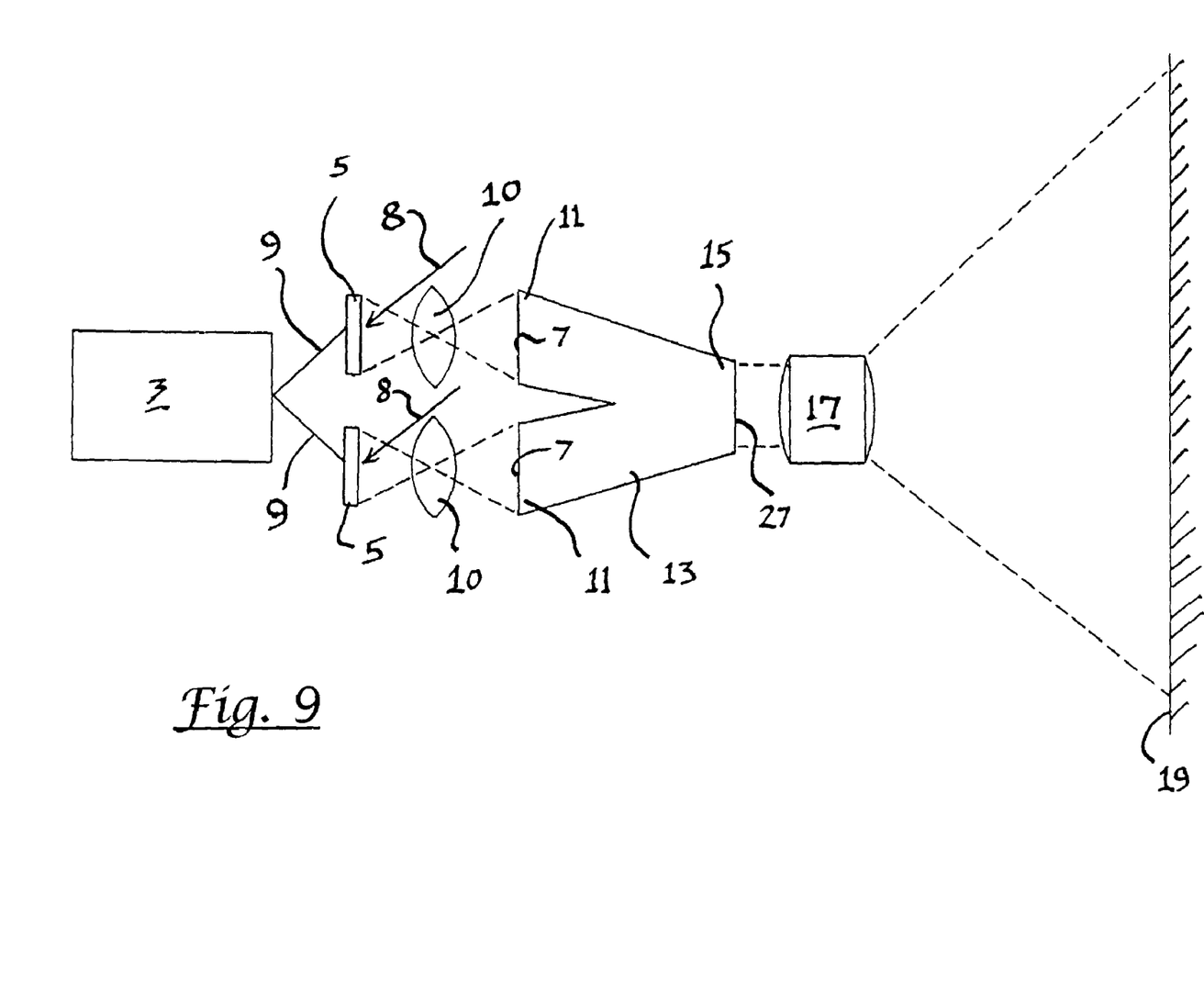
FIG. 9 shows as alternate embodiment of the system of FIG. 1 wherein the image sources are reflective displays that require a separate source of light.

The system illustrated in FIG. 1 is appropriate for a type of display device 5 that transmits or emits light, such as AMLCD, OLED, CRT, FED, plasma, or EL displays. Where the display does not generate its own light, as in DMDs, which reflect light, a slightly different system is used, such as the one shown in FIG. 9. In this system, an appropriate source of light 8 directed to the displays 5 is provided, which may be on-axis or off-axis, depending on the type of reflective display used. Appropriate optics 10 transmit the reflective-light image from the displays 5 to the input portions 11 of combiner 13, which may be larger or smaller than the screens of displays 5, and are dimensioned so as to conform with the size of the image transmitted by optics 10. The optics 10 may be a simple lens or a more complex lens system. The input portions and the image sources preferably do not differ in size by more than about ±20 percent.

Figure 2:
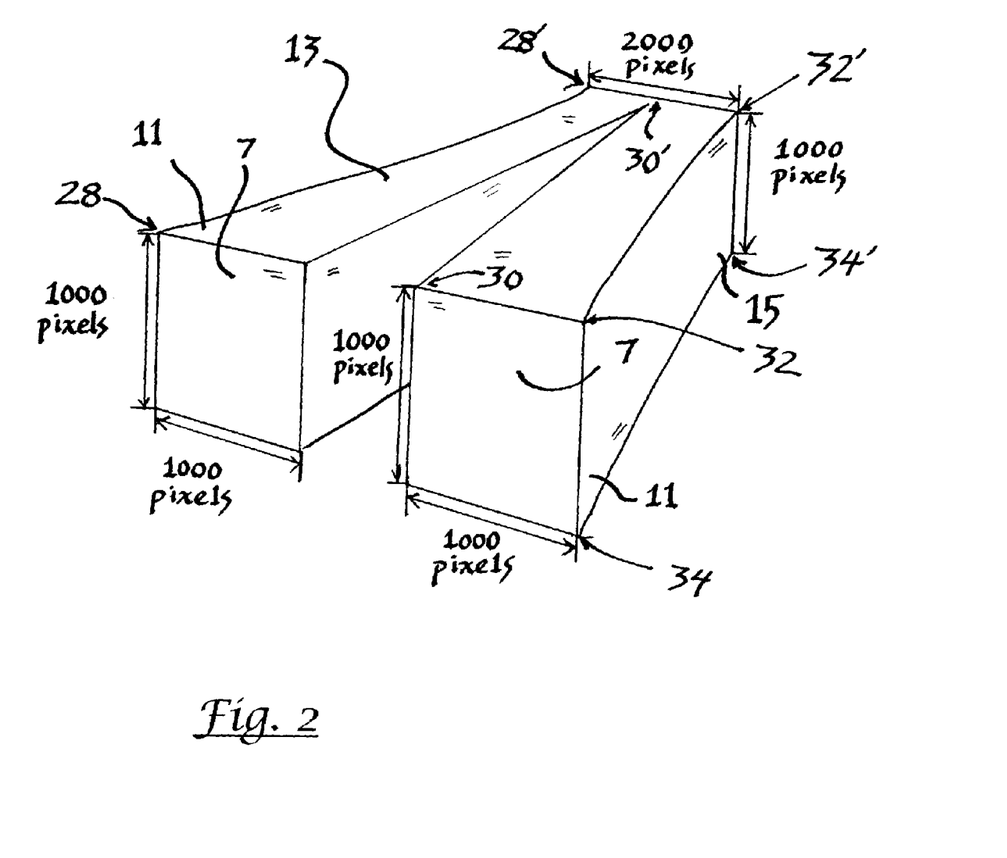
FIG. 2 shows a perspective view of an optical component according to the invention that increases resolution in a single dimension of the output image.

As best shown in FIG. 2, each input portion of optical component 13 is configured to align with the screen of the respective image display device 5 and receive light of the image displayed thereon. This light passes into the optical component 13 through the input portion 11 that is adjacent the image display device 5 and is transmitted through the component 13 to the output portion 15.

In the shown embodiment, output portion 15 has an output face 27 that transmits an output image of the same size and area as the images from the input images. The output image is a combined image containing the transmitted light from the pixels from the two input images combined. The light of the input images is received and transmitted within the combiner as an image made up of a field of discrete locations or pixels of the image, in the example 1000×1000 pixels for each input image. At the same time, the output image is, in the embodiment shown, an output image field of 2000×1000 pixels, containing both of the input images, being effectively a combination of the two input images side by side, with no seam, and compressed laterally to accommodate the doubled number of pixels.

The combiner of FIG. 2 thus effectively doubles the resolution in one dimension, the lateral dimension, of the output image as compared to the resolution of the input image. At the same time, the higher-resolution image is the same size as the lower-resolution image sources, and optics sized for use with the lower resolution image display devices can also be used to project or display the higher-resolution output from the output face 27, i.e., the output end of the optical combiner may be substituted for the single image display device in an existing system without substantial modification of the relay optics.

Figure 3:
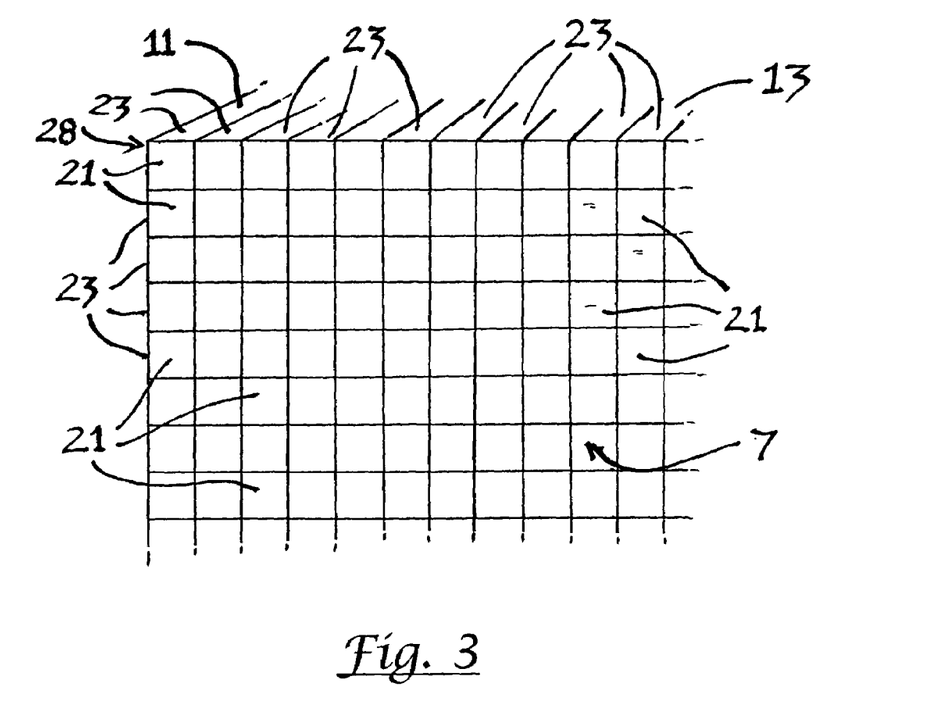
FIG. 3 shows an enlarged detail view of a portion of the input end of the optical component of FIG. 2 showing the distribution of input ends of the optical fibers thereof.

FIG. 3 shows a detail of one of the input faces 7 of the component 13, which is adapted to receive the light of the image from the screen of the associated image display device 5 which is placed adjacent or in engagement therewith. Each of the faces 7 of input ends 11 of the optical component 13 is made up of the input ends 21 of a bundle of optical fibers 23 that are clustered together in an input pattern of face 7 over the screen of the associated image display device 5. The face 7 is preferably flat, especially in a system as in FIG. 1 using flat-screen displays. Where the surface of the image sources 5 is curved, or, if, in a system as in FIG. 9, optics 10 make it advantageous, the input face 7 may alternatively be a curved surface. In the input pattern, each optical fiber input end 21 aligns with a respective pixel or location in the input image of one of the image display devices 5 and guides the light therefrom to the distal end of the optical fiber, which is a corresponding pixel in the image of the output end 15. The ends of the fibers are secured in the pattern, and are preferably fused together in the input pixel pattern by heating and compressing them together. This yields fiber optic ends 21 having a square cross section, as in the embodiment shown in FIG. 3, although if less pressure is applied, fusing may be obtained without substantial deformation of the usually circular cross section of the starting fibers.

Figure 4:
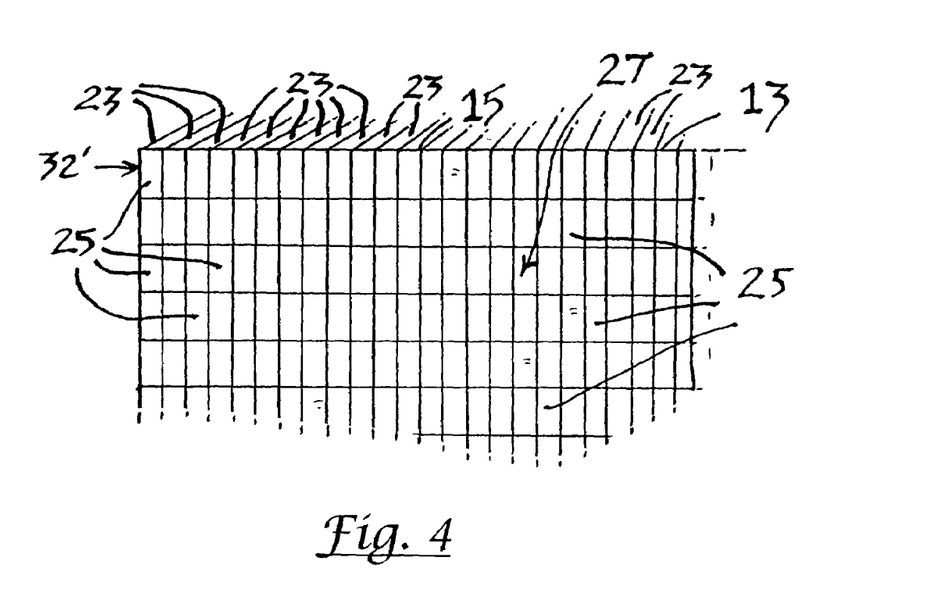
FIG. 4 shows a detail view of a portion of the output end of the optical component of FIG. 2 showing the distribution of output ends of the optical fibers thereof.

Referring to FIG. 4, the optical fibers run in parallel to output end 15 of the component 13, which is configured similarly to the input face 7. Output end 15 has an output face generally indicated at 27 made up of a grid or pattern of the ends 25 of the fibers 23. The output face is preferably finished, as by diffusion coating or grinding, so as to avoid a chicken-wire effect encountered in some coherent image guides.

According to the illustrated embodiment, the fiber optics are tapered so that the size of the input pixel at input ends 21 at the image display devices 5 is reduced to a smaller area pixel at the output end 25 of each of the fibers 23 of the optical component 13. In the embodiment of FIGS. 2 to 4, the output pixels at ends 25 are narrower than input pixels at input ends 21 only in one dimension, i.e., the lateral, and resolution is increased only in the lateral dimension.

The input ends of the optical fibers are in locations that map directly to positions in the pattern of output pixels. In the embodiment of FIG. 2, this means that the upper left hand corner pixel, indicated at 28, connects by its fiber to the pixel in upper left hand corner 28' in the output end. The pixel in upper left hand corner 30 of the other input end 11 connects to a pixel at a midpoint 30' of output face 27. The rest of the pixels essentially follow in accordingly to corners 32 and 34, the pixels of which are mapped to connect to pixels at 32' and 34', respectively. In other words, the coordinates x', y' of the pixels in the 1000×2000 pixel output field are given by the equation $$[x', y'] = [x+1000*(S-1), y]$$

where [x, y] are the coordinates of the pixel in its image source, and S is the number of the source, either 1 for the input end 11 on the left in FIG. 2, or 2 for the input end 11 on the right.

The light of the output image leaves output face 27 of the component 13 in a direction perpendicular to the output face 27 and proceeds therefrom to the relay optics 17 for projection. These optics may be one of several systems used in the prior art to project light from small image sources, such as the lenses or combinations of lenses of projectors, well known by those in the art.

According to the embodiment of FIG. 1, the projection screen 19 is a stationary flat screen at a distance from the viewer, but projection screen 19 may be flat or curved, e.g., toroidal, cylindrical or spherical. Alternatively, the screen may be part of a head-mounted device supported on the head of the viewer, usually a sort of visor against the interior of which the images are projected. Also, alternatively, instead of projecting the image for reflection to the eye of the viewer, the relay optics may transmit the output image directly to the eye of a viewer, without projection, using suitable optics well known in the art of image display.

Figure 5:
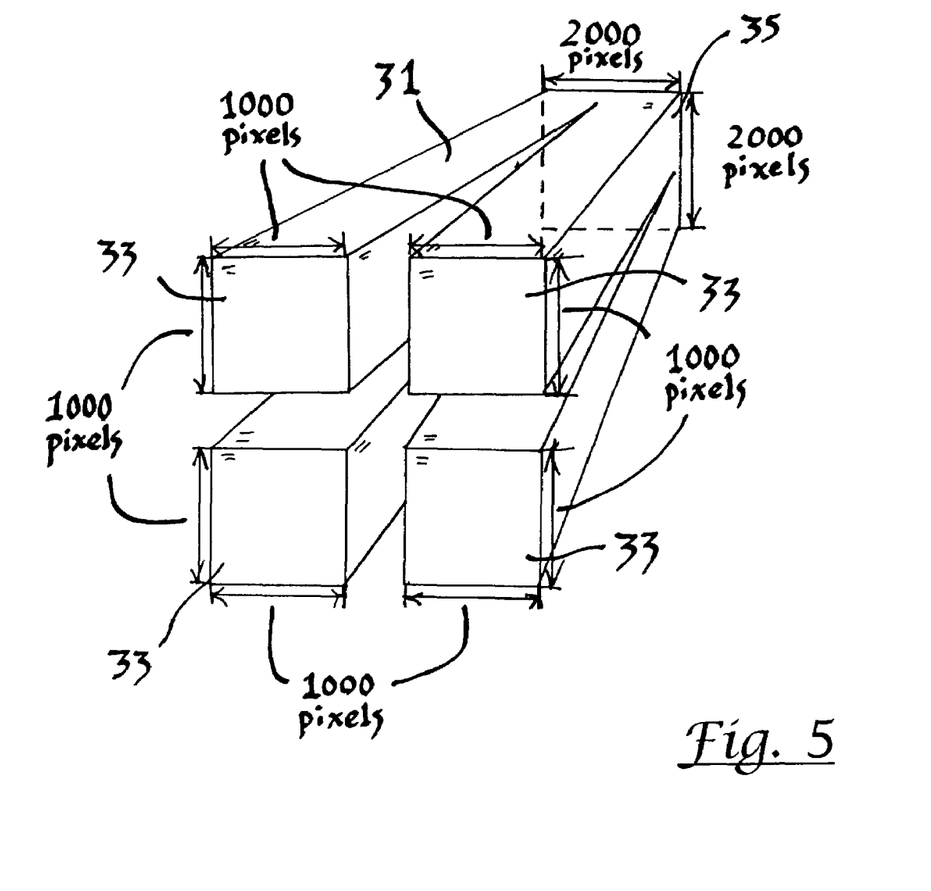
FIG. 5 is a perspective view of an alternate embodiment of optical component wherein four image sources are used to produce an output image of twice the resolution in each dimension of the input images.

FIG. 5 shows an alternate embodiment of optical component in which the resolution of the image sources 5 is increased in both dimensions of the output image. Optical component 31 has four input faces 33 that are each configured to receive and transmit light of a 1000×1000 pixel image. The fiber optics of the component 31 transmit these pixels to output end 35. At output end 35, the images are combined to a single output image having 2000×2000 pixels in an area equal to the area of one of the input faces. As a result the pixels are each reduced in size by a half in each dimension, and the resolution in each dimension is doubled. It will be understood that a similar structure could be used to combine any number of image sources into a single output image that has a higher pixel resolution than the input images. So long as the total area of the output face is less than the total area of the input faces, there is an improvement in resolution, so the size of the output face need not be the same as the input faces. However, where the output face is the size of the input faces and the screens of the display devices, as has been mentioned previously, optics sized to process light from the microdisplays can be used to project the higher resolution output from the combiner, this being advantageous both for convenience and cost.

Figure 6:
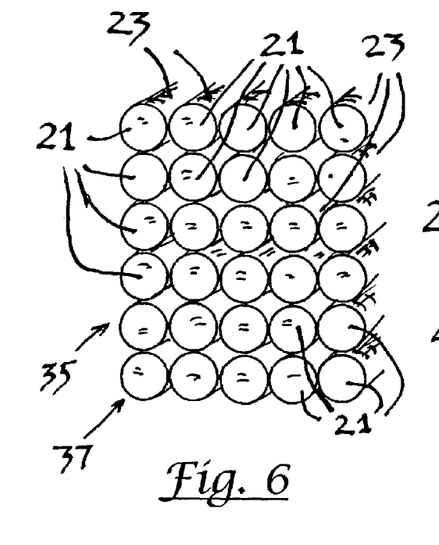
FIG. 6 is a detailed schematic of distribution of the input ends of fiber optics in a component according to the invention.
Figure 7:
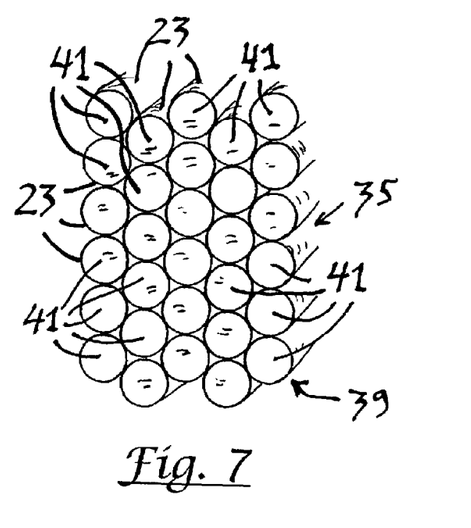
FIG. 7 is a detailed schematic of distribution of the output ends of fiber optics in an alternate embodiment component.

A further alternate embodiment of the combiner for use in a system as shown in FIG. 1 to increase the resolution or pixel density of the projected or enlarged image is illustrated in FIGS. 6 and 7. FIG. 6 displays the input face of one of the input ends of an optical combiner having a configuration similar to the combiners 13 or 31 of FIGS. 2 to 5. In this combiner 35, the input ends 21 of the optical fibers 23 are secured in an input pattern in the input face 37 of one, several, or all of the input ends of the combiners 13 or 31. This pattern can be described as a Cartesian grid or matrix, and is commonly the pattern of pixels in an LCD screen or a microdisplay. Consequently, in this pattern, each of the input ends 21 overlies a respective color pixel in the microdisplay screen associated with that input end. It may be noted that, in the embodiment illustrated, the input ends 21 of the optical fibers 23 are in a less compressed form and retain to some degree their circular cross section as compared with the fibers in the embodiment of FIGS. 2 and 3. A more compressed pattern of the input ends, such as in FIG. 2, may be used as well.

The fibers 23 extend in parallel similarly to the embodiments of FIGS. 4 and 5 through the combiner 35 to an output face 39 made up of the output ends 41 of the fiber optics 23 secured in an output pattern from which the light of the output image proceeds to relay optics 17 for projection and viewing.

The output pattern of the ends is a hexagonally close-packed pattern of the substantially circular output ends 41 of the fibers 23. Even if there is no taper in the fibers 23 from the input to the output ends thereof, the packing of the ends 41 is according to a denser pattern than the input pattern, and the density of the pixels of the output image is necessarily denser, in terms of pixels per unit area, than the density of the pixels input at the input ends of the combiner 37. Resolution of the output image is thus increased over that of the input or inputs.

It will be understood that the image generator used with such a combiner 37 prepares images for display on the image display devices 5 that are configured to have their pixels packed and shifted from Cartesian display patterns to a hexagonal packed pattern.

Figure 8:
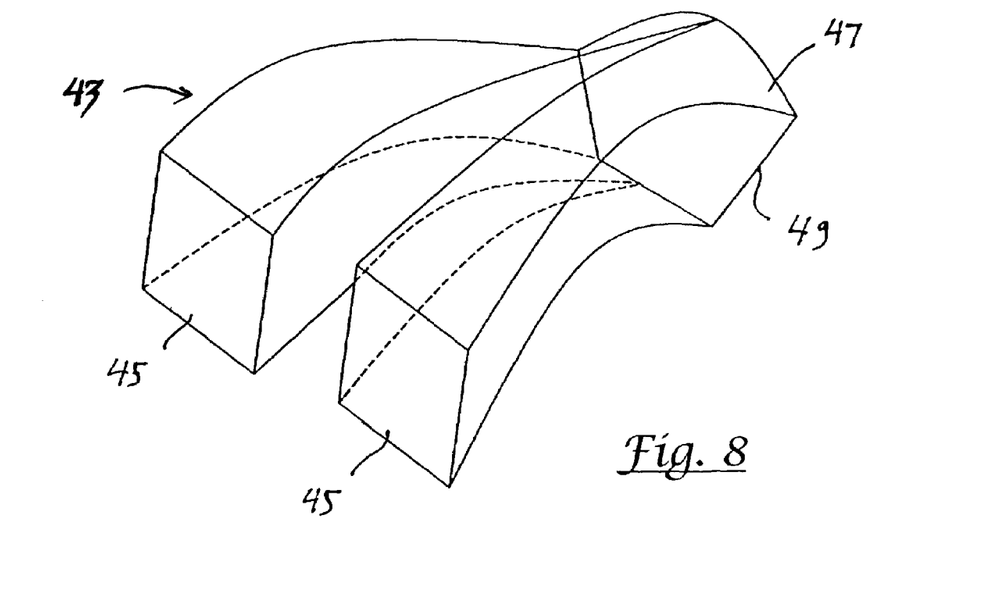
FIG. 8 shows a perspective view of a further alternate embodiment of optical component in which the component creates a compensating distortion for the subsequent optics to project a combined image from two image sources with reduced aberration.

With reference to the embodiment of FIG. 8, the relay optics often introduce an aberration to images passing therethrough, which is undesirable. For example, when an image is projected from an off-center point that is not the eyepoint of the viewer, the relative angles of the projector, the screen and the eye of the viewer normally create an aberration, i.e., a distortion of the projection as viewed. In addition, the relay optics in the above systems enlarge the output image, preferably using lenses or systems of lenses, as are well known in the projection art. To reduce cost and weight, the lenses of the relay optics are dimensioned to have the minimum diameter necessary for the image of being enlarged and projected and fewest components. This generally means that the diameter of the lenses is approximately the same as the diagonal measurement of the output image from the output face 27. This is desirable from a cost standpoint, but the smaller lenses can introduce aberrations into the image being projected. In addition, the aberration known as field curvature aberration is often encountered when a flat projection screen is used for projection through a lens system, because the geometry results in varying distances of the points on the screen from the lens and this puts some points out of focus. Other shortcomings of spherical optical elements or lenses can also introduce aberrations.

To correct for aberration, particularly distortion from off-center projection, an optical combiner such as is shown in FIG. 8 may be used with a system as shown in FIG. 1, especially in a head mounted system. Combiner 43 is composed of optical fibers running in parallel from input ends 45 to output end 47. The input ends 45 are configured similarly to the input ends 11 of the combiner embodiment of FIG. 2. The input ends of the optical fibers of component 45 are secured in a pattern or matrix as seen in FIG. 3 or 6, and these input ends align with pixels or locations on the screens of the image devices 5 as in FIG. 2, although different numbers of fibers may make up the ends, for example 1000×1000 or 800×600 fibers in each input end. Light from the image devices 5 enters into the fibers and proceeds therethrough to the opposing ends of the fibers in the output face 49 of the combiner 45.

Output face 49 transmits an output image made up of all of the light received by the input ends of the fibers and guided to the other end of the combiner. The positions of the opposing ends of each fiber are set in a pattern that imparts to the input images from input ends 47 a counter-distortion or alteration that at least partially offsets the aberration created during transmission through the relay optics.

Figure 10:
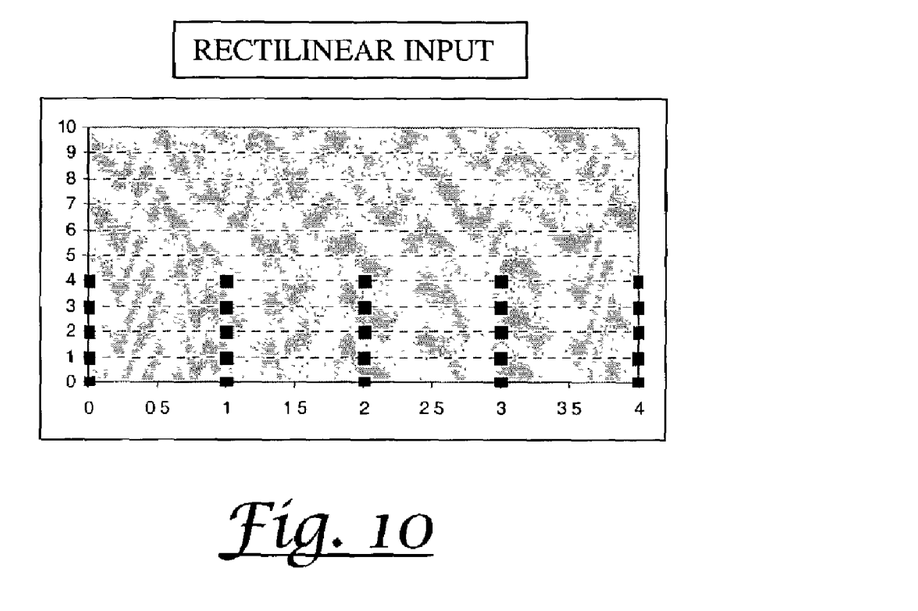
FIG. 10 is a graph showing a rectilinear distribution of reference points on a display before projection.
Figure 11:
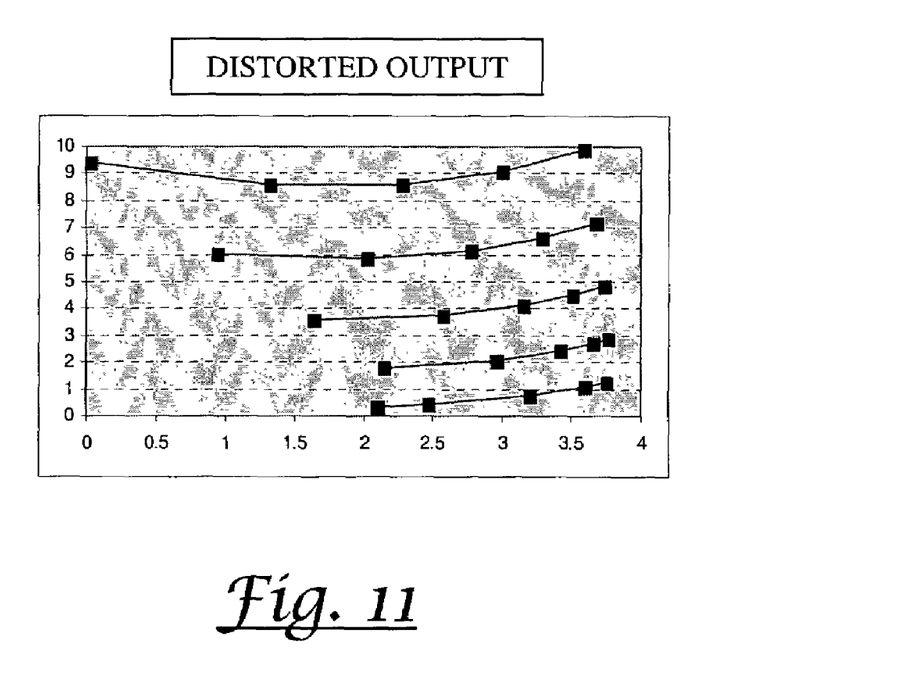
FIG. 11 is a graph showing an exemplary distribution of the reference points of FIG. 10 after projection with an optical system that introduces substantial distortional aberration.

Optical design methods are used to provide the precise aberration resulting from the optics. One format for this aberration description especially useful for distortion aberration is by polynomial expressions that map the input pixel coordinates (x,y) to distorted output pixel coordinates (x,y). A two-dimensional third order polynomial in x and y, $$F(x,y) = a_{00}x^0y^0 + a_{01}y^0x^1 + a_{02}y^0x^2 + a_{03}y^0x^3 + a_{10}y^1x^0 + a_{11}y^1x^1 + a_{12}y^1x^2 + a_{20}y^2x^0 + a_{21}y^2x^1 + a_{30}y^3x^0$$

relates the undistorted two dimensional space to a distorted two dimensional space where $a_{00} \ldots a_{30}$ are the appropriate coefficients defining the particular distortion. As an example, Table 1 provides the coefficients for the two-dimensional third order polynomial fit for the transformation of the rectilinear pixel locations input (shown graphically in FIG. 10) to the distorted output expected, which is shown in FIG. 11.

TABLE 1

| Coefficients | Coefficients for x polynomial :$F_x(x,y)$ | Coefficients for y polynomial :$F_y(x,y)$ |
|---|---|---|
| $a_{00}$ | 2.1 | 0.5 |
| $a_{10}$ | −0.0018 | 1.4 |
| $a_{01}$ | −0.009 | −0.02 |
| $a_{20}$ | −0.005 | 0.2 |
| $a_{11}$ | −0.03 | −0.2 |
| $a_{02}$ | −0.0005 | −0.13 |
| $a_{30}$ | −0.01 | 0.002 |
| $a_{21}$ | −0.006 | −0.006 |
| $a_{12}$ | −0.006 | 0.06 |
| $a_{03}$ | −0.001 | 0.05 |

Based on the defined distortion, an inverse alteration or distortion can be calculated that, when applied to an input to the projection system, results in rectilinear, or close to rectilinear, format of the ultimate projection or display. This inverse distortion is converted to a pattern for the output image from the combiner 13, and the output ends of the optical fibers are secured in that pattern. This results in the output end of the combiner having an output face of a inversely distorted shape, as is illustrated in FIG. 8, where the output image contains the pixels of the input images combined and counter-distorted to an inverse of the distortion created by a subsequent projection or display, and as a result the distorted projection or display thereof yields a substantially rectilinear image to be viewed by the user. Use of such a counter-distorting image guide makes it possible to use all of the pixels of the image display devices of the system despite the aberration, which results in maximum resolution of the projected image. Furthermore, the output pattern preferably has a pixel density at least in a portion thereof that is higher in terms of pixels per unit area than the input pixels, resulting in a further increase in resolution of the image displayed relative to direct display from a single image source.

The exemplary combiner 45 of FIG. 8 corrects for a distortion of off-center projection somewhat different from that described by the coefficients in Table 1, but it will readily be understood by those of skill in the art that almost any optical distortion or aberration may be corrected completely or partially by an appropriately devised combiner image guide with an appropriately formulated output image pattern. It will also be understood that the output face may take any one of a variety of shapes, depending on the particular alteration required by the optics being used with the combiner, with the positioning of the pixels of input in the output image being effectively distributed however necessary for the individual application, as the optical system requires.

In addition, while output face 49 is flat in the illustrative embodiment, the output face may also be shaped in three dimensions, e.g., as a spherical portion, for example, or otherwise curved, to help compensate for the aberrations inherent in the optics. For example, to correct for field-curvature aberration, the output face 49 will be a concave or convex surface, preferably that constitutes a portion of a sphere the center of which is on the optical axis of the relay optics. This curved output surface may be combined with the counter-distortion alteration of the pixels of the embodiment of FIG. 8, or it may be applied to a rectilinear output pattern, such as shown in the embodiments of FIG. 4 or 5.

It should also be understood that, while the combiner 45 has only two separate input ends 45, the correction of aberration may be applied where a component has only one input image, or has four or more image inputs, as in the combiner of FIG. 5.

The optical combiners of the present invention can be made by obtaining optical fibers of a suitable dimension for alignment with the pixels of a microdisplay and in an output end of desired dimension. In the embodiments of FIGS. 2 to 4 and 5, the output end is smaller and the optical fibers must be tapered, which is accomplished by drawing the fibers to become as narrow or small in cross section as desired, and until they are of the desired dimensions at their input and output ends. The tapered fibers are then placed together in a die, or sieve, that controls the location of each of the ends of the fibers in the input for one of the image sources, and the fibers are secured in that position, preferably by heating the ends of the fibers above a threshold temperature for fusing the glass thereof so that the ends of the fibers fuse together and are fixed in the assigned locations to form the input end adapted to be used with one of the image sources. Two or more of these sets of fibers can then be combined by positioning the output ends of the fibers in another die and fusing together the output ends so that a single output face is provided while the input ends remain separate for attachment to separate image sources. The fusing may be performed just at the ends, or alternatively throughout the entire length of the component.

Alternatively, there are commercially available multi-bundles of optical fibers, sometimes referred to as coherent fiber optic image guides or fiber optic tapers, that can also be used to produce some embodiments of the component or combiner of the invention. Suitable multibundles or coherent image guides are manufactured or sold by Schott Fiber Optics Inc. of Southbridge, Mass., or the Fiber Optics Division of Schott Glas of Mainz, Germany, as well as by a number of other companies, such as Incom, Inc. of Charlton, Mass. or Fujikura America Inc., located in Marietta, Ga. These image guides are usually clusters of optical fibers that have the ends thereof fused together, usually in a grid pattern as in FIG. 3 or 6. To form the component 13 of the invention, if the tapered bundle does not have the correct resolution of pixels in its fibers, the image guide is drawn and/or compressed under appropriate temperature conditions to make the optical fibers of the desired cross-section and size at both ends. The tapering bundles of fibers are then aligned side by side and fused together to form a single output end in which there is no seam between the fibers in different bundles.

The optical fibers used in the combiners or components of the invention are preferably glass fibers well known in the art that receive visible light at one end and transmit it through to the other end. However, it is possible to apply the beneficial aspects of the invention to different types of fibers, for instance plastic optical fibers. Also, the invention may be applied with fibers that generate visible light in reaction to infrared light input. In such a system, the image devices 5 would create appropriate infrared images and apply them to inputs of the fibers, which would generate a suitable output image at the opposite end thereof, along the lines of the present disclosure.

It will be understood that the invention herein extends well beyond the embodiments of the disclosure, and the terms used in this specification should be understood to be language of description, not limitation, as those of skill in the art with this specification before them will be able to make changes and modifications therein without departing from the scope of the invention.

What is claimed is:

1. An optical system comprising:
   a combiner comprising optical fibers each having an input end and an output end;
   said optical fibers being secured so that said combiner has image input portions each having therein a respective set of the input ends of the optical fibers secured in an input pattern having an input area;
   each input portion of the combiner being configured to receive light of a respective input image displayed by a respective image source such that said optical fibers each transmit a respective portion of the light received from the associated image to the output end thereof;
   said output ends of the optical fibers being secured in an output pattern in an image output portion of the combiner, said output end being configured so as to transmit to relay optics an output image therefrom containing the portions of the light transmitted through the optical fibers from the input portions; and
   said output pattern corresponding to said input patterns so that the output image is a composite image comprising a combination of images each coherently transmitted from a respective one of said input images;
   said output image having an area that is less than a sum of said input areas; and
   said output pattern having discrete component fields each corresponding to a respective input image, the light from each of the input images each being transmitted only from the output ends of the optical fibers in the component field corresponding to said input image.

2. The optical system of claim 1 wherein the size of said output image is the same as the size of at least one of the input images.

3. The optical system of claim 1 wherein the output ends of the combiner are supported in a hexagonally-grouped pattern.

4. The optical system of claim 1 wherein the output ends of the combiner are supported in a Cartesian grid pattern.

5. The optical system of claim 1 wherein the input ends of the fibers are larger in cross-section than the output ends thereof.

6. The optical system of claim 1 wherein the output ends of the optical fibers are narrower than the input ends in only one dimension.

7. The optical system of claim 1 wherein the output ends of the optical fibers are narrower than the input ends in two dimensions.

8. The optical system of claim 1 wherein the input ends of the optical fibers are fused together in said input portions.

9. The optical system of claim 8 wherein the output ends of the optical fibers are fused together in said output pattern.

10. The optical system of claim 1 wherein the output ends are positioned in the output pattern so that the combiner creates an alteration in the input images that at least partially counters aberrations caused by projection of the output image.

11. The optical system of claim 1 wherein the input portions are configured to receive light from said images displayed by microdisplay image devices adjacent thereto.

12. The optical system of claim 11 wherein the microdisplay devices produce said input images each as a field of pixels of varying degrees of illumination, and said input ends of the optical fibers of the combiner are grouped in an input pattern that is adapted to align the input ends of the optical fibers each with a respective pixel of the associated input image.

13. The optical system of claim 11 wherein the input ends have a diagonal measurement that is not greater than two inches.

14. The optical system of claim 11 wherein the input portions have a flat surface defined by the ends of the optical fibers.

15. The optical system of claim 1 wherein the input portions have a curved surface defined by the ends of the optical fibers.

16. The optical system of claim 11 wherein the input ends of the optical fibers are each organized in an input pattern of a matrix of at least 800×600 fibers.

17. The optical system of claim 11 wherein the input ends of the optical fibers are each organized in an input pattern of a matrix of at least 1000×1000 fibers.

18. The optical system of claim 1 wherein the sets of optical fibers are fiber optic tapers.

19. The optical system of claim 1 wherein the combiner yields a resolution at said output image that is at least twice the resolution in pixels per unit area at each of the input images in at least one dimension.

20. The optical system of claim 1 wherein said combiner has four input portions.

21. The optical system of claim 20 wherein the area of the output pattern is not substantially greater than the area of each of the input patterns.

22. The optical system of claim 1 wherein said output pattern incorporates an alteration relative to the input patterns that is configured to at least partially counter an aberration created in a relay optic system to which the combiner is adapted to transmit the output image.

23. The optical system of claim 22 wherein said alteration includes a counter-distortion relative to the input patterns that is configured to at least partially counter a distortion in the relay optic system to which the combiner is adapted to transmit the output image.

24. The optical system of claim 22 wherein said alteration is configured to at least partially counter a field-curvature aberration in the relay optic system to which the combiner is adapted to transmit the output image.

25. The optical system of claim 24 wherein said output pattern being such that the output end of the combiner has an output face comprising a curved surface transmitting the output image.

26. The optical system of claim 25 wherein said curved surface is a spherical portion.

27. An optical component comprising:
a combiner formed of optical fibers,
each optical fiber having a fiber input end and a fiber output end,
said optical fibers being grouped together so that said combiner has a plurality of image input ends and an image output end,
each image input end of said combiner being made up of a respective subset of the input ends of the optical fibers supported in an input pattern so that said input ends are each secured in a respective position so as to align with a respective pixel of a microdisplay when aligned with said image input end and to receive from said pixel light corresponding to an input image displayed on the microdisplay at an input resolution of pixels per area,
the image output end being formed of the output ends of the optical fibers supported in an output pattern of pixels and being configured to transmit to an optical system an output image therefrom at an output resolution of pixels per area, said output image being composed of light from the pixels of the microdisplays received from the input ends,
said output pattern corresponding to said input patterns so that the output image is a composite image comprising a combination of images each coherently transmitted from a respective one of said input images; and
said output resolution being higher in at least one dimension than the input resolutions; and
said output pattern having discrete component fields each corresponding to a respective input image, the light from each of the input images each being transmitted only from the output ends of the optical fibers in the component field corresponding to said input image.

28. The optical component of claim 27 wherein the input ends of the optical fibers in the input ends are secured in said input patterns as a matrix to receive each of at least 800×600 pixels of an image from an associated microdisplay device.

29. The optical component of claim 27 wherein the input ends of the optical fibers in the input ends are secured in said input patterns as a matrix to receive each of at least 1000×1000 pixels of an image from an associated microdisplay device.

30. The optical component of claim 29 wherein the input ends have a rectangular flat surface defined by the input ends of the optical fibers, and said rectangular surfaces have a diagonal measurement of less than two inches.

31. The optical component of claim 30 wherein said image output end is configured to transmit said output image to a relay optic system so as to display said output image to a user, said output ends of the optical fibers being supported in the output pattern in positions such that the optical component introduces an alteration in the output image relative to the images received in the input ends, said alteration at least partially countering an aberration of the relay optic system.

32. The optical component of claim 31 wherein the aberration of the relay optic system includes a distortion and the alteration includes a counter-distortion that is at least partially an inverse of said distortion.

33. The optical component of claim 31 wherein the aberration of the relay optic system includes a field-curvature aberration and the output ends in the output pattern are positioned to form a curved surface output face in the output end of the combiner.

34. The optical component of claim 31 wherein the curved surface output face is a spherical portion.

35. The optical component of claim 29 wherein the component has at least four input ends each configured to receive images from microdisplays.

36. An optical system comprising:
   a display device transmitting light in a pattern of an image to be displayed;
   an optical component comprising optical fibers each having an input end adapted to receive light and an output end through which the light received is transmitted;
   said component having an input end containing the input ends of the optical fibers positioned in an input pattern so that each of said fibers receives light from a respective pixel or location of the image displayed by the display device and transmits said light to the output end thereof,
   said component further having an output end composed of the output ends of the optical fibers supported so as to transmit the light of the image received at the input end in an output pattern;
   said output pattern corresponding to said input pattern so that the light is transmitted as an output image comprising an image coherently transmitted from the image displayed by the display device;
   an optical relay system receiving the output image from the output end of the component and transmitting said output image to one or two eyes of a user for viewing thereof;
   said optical relay system having imperfect imaging performance so as to introduce an aberration in light of images passing therethrough;
   said component having said output pattern with the output ends of the optical fibers in positions such that the output pattern has an alteration of the input pattern that at least partially counteracts the aberration of the relay optics.

37. The system of claim 36 wherein the aberration includes a distortion aberration, and the alteration of the image includes a counter-distortion inverse to the distortion aberration.

38. The system of claim 37 wherein the output pattern is planar.

39. The system of claim 36 wherein the aberration includes a field-curvature aberration, and the alteration of the image reduces said field-curvature aberration.

40. The system of claim 39 wherein the output pattern positions the output ends of the fibers in a curved surface.

41. The system of claim 36 wherein the optical relay system comprises a projection lens arrangement that projects the light from the component, and a projection screen onto which said light is projected so as to be viewed by the user.

42. The system of claim 36 wherein the optical relay system comprises an apparatus that directs the output image from the component into an eye of the user.

43. The system of claim 36 wherein the input ends of some of the fibers are larger in cross-section than the output ends thereof.

44. The system of claim 36 wherein the input ends of the optical fibers are fused together in said input pattern.

45. The system of claim 44 wherein the output ends of the optical fibers are fused together in said output pattern.

46. The system of claim 36 wherein the display device is a microdisplay image device.

47. The system of claim 36 wherein the display device is microdisplay that emits or transmits the light of the image displayed thereon.

48. The system of claim 47 wherein the display device is an LCD or AMLCD microdisplay.

49. The system of claim 47 wherein the display device is a CRT display device.

50. The system of claim 36 wherein the display device is microdisplay that reflects light from a light source to transmit the light of the image displayed thereon.

51. The system of claim 50 wherein image input optics transmit the reflected image light from the display device to the input end of the combiner.

52. The system of claim 50 wherein the display device is a digital micromirror display device.

53. The system of claim 36, and further comprising
   a second display device displaying images in parallel with the first display device;
   a second set of optical fibers secured together so that the input ends thereof form a second input end of the component and each receive respective light of a pixel of an image displayed on the second image display devices;
   the second set of optical fibers having output ends that are secured at the image output end of the component with the output ends of the first set of optical fibers so that the output ends of both sets of optical fibers are combined adjacent each other in the output image of the component; and
   said output pattern having discrete component fields each corresponding to a respective display device, the light from each of the display devices each being transmitted only from the output ends of the optical fibers in the component field corresponding to said display device.

54. The system of claim 36 wherein the input patterns of the input ends of the optical fibers each comprise a matrix of at least 800×600 pixels.

55. An optical system comprising:
   an image generator;
   a plurality of microdisplay devices operatively associated with the image generator and each having a display screen with a diagonal dimension of less than two inches;
   the image generator generating and transmitting to each of said microdisplay devices a respective electronic image signal, and said microdisplay devices each producing from the associated electronic image signal a respective input image made up of pixels of transmitted light;
   an optical combiner comprising a plurality of sets of optical fibers, said optical fibers each having an input end and an output end;
   each set of optical fibers being associated with a respective one of the display screens of the microdisplay devices and having the input ends thereof secured in an input pattern adjacent thereto so that each optical fiber receives the light from a respective pixel of the associated microdisplay device and transmits said light to the output end thereof;

the output ends of the sets of optical fibers being secured in an output pattern in which the light transmitted through the optical fibers is combined in an output image having an area and made up of pixels of the light transmitted through the optical fibers;

said output pattern corresponding to said input patterns so that the output image is a composite image comprising images each coherently transmitted from a respective one of said input images so as to be adjacent each other in the output image; and said output image having a greater number of the pixels per area thereof than the microdisplay devices; and said output pattern having discrete component fields each corresponding to a respective input image, the light from each of the input images each being transmitted only from the output ends of the optical fibers in the component field corresponding to said input image.

56. The invention according to claim 55, and further comprising relay optics receiving the light of the output image and transmitting said light to be viewed by a user, said relay optics having an aberration including at least one of distortion and field-curvature aberration, said output pattern being such as to introduce into the output image an alteration that at partly inversely counteracts said distortion or field curvature aberration.

57. The invention according to claim 56, wherein the relay optics include a projection screen supported so as to be viewed by the user.

58. The invention according to claim 56, wherein the relay optics include an optical system directing the output image to an eye of the user.

59. The system of claim 55 wherein the display device is microdisplay that emits or transmits the light of the image displayed thereon.

60. The system of claim 59 wherein the display device is an LCD or AMLCD microdisplay.

61. The system of claim 59 wherein the display device is a CRT display device.

62. The system of claim 55 wherein the display device is microdisplay that reflects light from a light source to transmit the light of the image displayed thereon.

63. The system of claim 62 wherein image input optics transmit the reflected image light from the display device to the input end of the combiner.

64. The system of claim 62 wherein the display device is a digital micromirror display device.

65. A method of displaying an image to a viewer, said method comprising the steps of:

generating at least two input images each representing a portion of the image to be displayed;

displaying each of the input images on respective screens of respective microdisplay devices so as to generate light corresponding to the input images;

transmitting the light from the input images through an optical combiner formed of optical fibers, said optical combiner outputting light of said input images combined in an output image, said output image being of higher resolution than said input images;

said output image being a composite image comprising images each coherently transmitted from a respective one of said input images and adjacent each other in the output image, said output image having discrete component fields therein each corresponding to a respective input image, the light from each of the input images each being transmitted only in the component field of the output image corresponding to said input image; and relaying the output image via relay optics to the viewer.

66. The invention according to claim 65, wherein said relaying includes projecting said output image on a screen supported for viewing by the viewer.

67. The invention according to claim 65, wherein said relay optics imparts a distortion to the output image, said optical combiner transmitting the input images with a counter-distortion that at least partly counteracts the distortion of the relay optics.

68. The invention according to claim 67, wherein said relay optics are supported on the head of the viewer.

69. The invention according to claim 65, wherein said relay optics imparts a field-curvature aberration to the output image, and said optical combiner transmitting the input images so as to at least partly counteract said field-curvature aberration.

70. The invention according to claim 65, wherein the combiner having an output face through which the output image is output, said output surface being a concave or convex curved surface.

71. An optical display system comprising:

a plurality of microdisplay devices each having a screen with a field of pixels, each of said pixels transmitting a portion of light of an image displayed on the associated screen, a plurality of sets of optical fibers, each set being associated with a respective microdisplay, and each of the optical fibers having an input end positioned so as to receive the portion of light from a respective pixel of the associated microdisplay, said optical fibers each having an output end and causing light to be transmitted from said output end responsive to introduction of light at the input end thereof, the output ends of the optical fibers being supported in an output pixel pattern wherein each of the output ends constitutes a respective pixel of an output image, said pixels transmitting light corresponding to the images displayed on the microdisplays, said output pixel pattern corresponding to said input ends so that the output image is a composite image comprising a combination of images each coherently transmitted from a respective image of one of said microdisplays, said output pixel pattern having discrete component fields each corresponding to a respective microdisplay, the pixels transmitting the light from each of the microdisplays being grouped coherently in the corresponding component field of the output image, the light from each of the microdisplays being transmitted only from the output ends of the optical fibers in the component field corresponding to said microdisplay, at least some of the output ends of the optical fibers being organized so as to provide an increase in resolution in at least a portion of the output pixel pattern relative to the field of pixels of the associated microdisplay, optics receiving the light from the output pixel pattern and transmitting said light to a user for viewing;

said optics including at least one lens.

72. The system of claim 71 wherein the optics are part of a head mounted projection system.

73. The system of claim 71 wherein input optics guide light from the microdisplays to the input ends of the associated set of optical fibers.

74. The system of claim 73 wherein the microdisplays are reflective displays and a light source provides light thereto which is reflected through said input optics to the optical fibers.

75. The system of claim 71 wherein the viewing optics are imperfect, resulting in aberrations in the viewed image passing therethrough, and said output pixel pattern has the pixels thereof positioned so as to at least partially counteract said aberration.

76. The system of claim 71 wherein the viewing optics have an aberration including at least one of distortion and field-curvature aberration, and said output pixel pattern has the pixels thereof positioned so as to at least partially inversely counteract said distortion or field curvature aberration.

* * * * *